(12) United States Patent
Chen et al.

(10) Patent No.: US 11,899,791 B2
(45) Date of Patent: Feb. 13, 2024

(54) AUTOMATED IDENTIFICATION OF MALWARE FAMILIES BASED ON SHARED EVIDENCES

(71) Applicant: International Business Machines Corporation, Armonk, NY (US)

(72) Inventors: Yu-Siang Chen, Minxiong Township (TW); Ci-Hao Wu, Taipei (TW); Ying-Chen Yu, Taipei (TW); Pao-Chuan Liao, Taipei (TW); June-Ray Lin, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 17/489,725

(22) Filed: Sep. 29, 2021

(65) Prior Publication Data

US 2023/0100947 A1    Mar. 30, 2023

(51) Int. Cl.
*G06F 21/00*    (2013.01)
*G06F 21/56*    (2013.01)
(Continued)

(52) U.S. Cl.
CPC .......... *G06F 21/561* (2013.01); *G06F 21/568* (2013.01); *G06N 5/02* (2013.01); *G06N 5/04* (2013.01)

(58) Field of Classification Search
None
See application file for complete search history.

(56) References Cited

U.S. PATENT DOCUMENTS

| 8,161,548 B1 | 4/2012 | Wan |
| 10,176,321 B2 | 1/2019 | Abbasi et al. |

(Continued)

FOREIGN PATENT DOCUMENTS

CN    111737694 A    10/2020

OTHER PUBLICATIONS

Hsiao, Shun-Wen et al., "Behavior Grouping of Android Malware Family", IEEE ICC 2016 Communication and Information Systems Security Symposium, May 23-27, 2016, 6 pages.

(Continued)

*Primary Examiner* — Andrew J Steinle
(74) *Attorney, Agent, or Firm* — Stephen J. Walder, Jr.; Schiller; Jordan Schiller

(57) ABSTRACT

A malware family identification engine constructs a graph data structure of direct relationships between malware instances and malware families, direct relationships between malware instances and detected tags, and indirect relationships between detected tags and malware families. The engine builds a dictionary data structure comprising detected tag entries linking each detected tag to one or more malware family nodes based on the graph data structure. The engine identifies significant indirect entities (SIEs) within the detected tag entries of the dictionary data structure and selects a SIE with a highest number of out-going links (OGLs) as a root node in a family tree data structure, recursively connects SIEs with a number of OGLs less than the highest number of OGLs to the root node in the family tree data structure, and converts each SIE name in the family tree data structure to a chained family entity name in the family tree data structure.

20 Claims, 5 Drawing Sheets

(51) Int. Cl.
*G06N 5/04* (2023.01)
*G06N 5/02* (2023.01)

(56) References Cited

U.S. PATENT DOCUMENTS

| | | |
|---|---|---|
| 10,432,648 B1 | 10/2019 | Xu et al. |
| 10,530,802 B2 | 1/2020 | Thomas et al. |
| 2017/0251003 A1* | 8/2017 | Rostami-Hesarsorkh ................... G06N 5/01 |
| 2017/0353481 A1* | 12/2017 | Kong .................. H04L 63/1425 |

OTHER PUBLICATIONS

Rastogi, Nidhi et al., "Predicting Malware Threat Intelligence Using KGs", arXiv:2102.05571v3 [cs.CR] May 24, 2021, 13 pages.
Ul Haq, Irfan et al., "Malware Lineage in the Wild", arXiv:1710.05202v1 [cs.CR] Oct. 14, 2017, 15 pages.

* cited by examiner

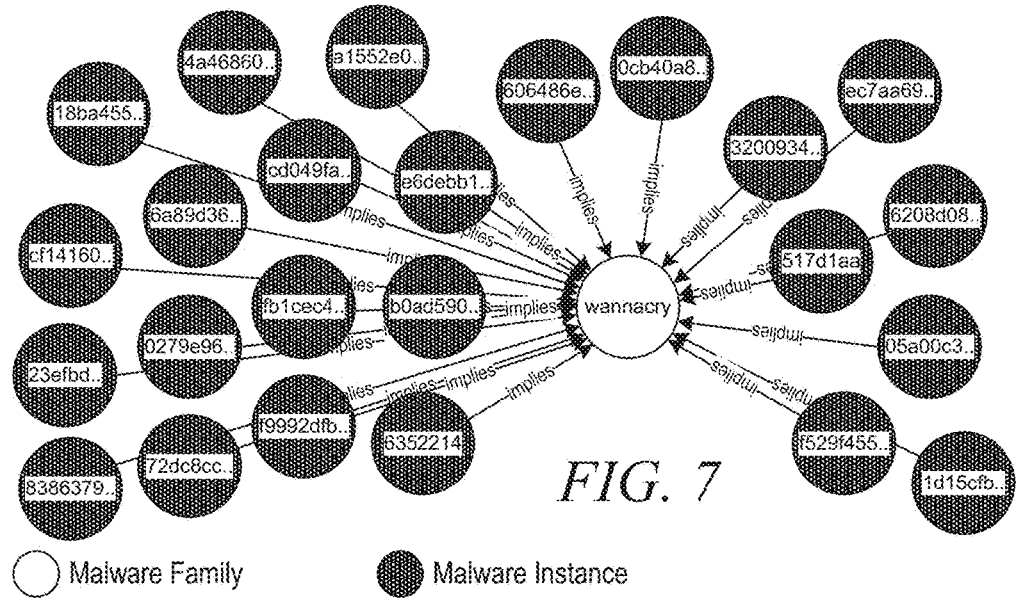
FIG. 7
○ Malware Family   ● Malware Instance
FIG. 8
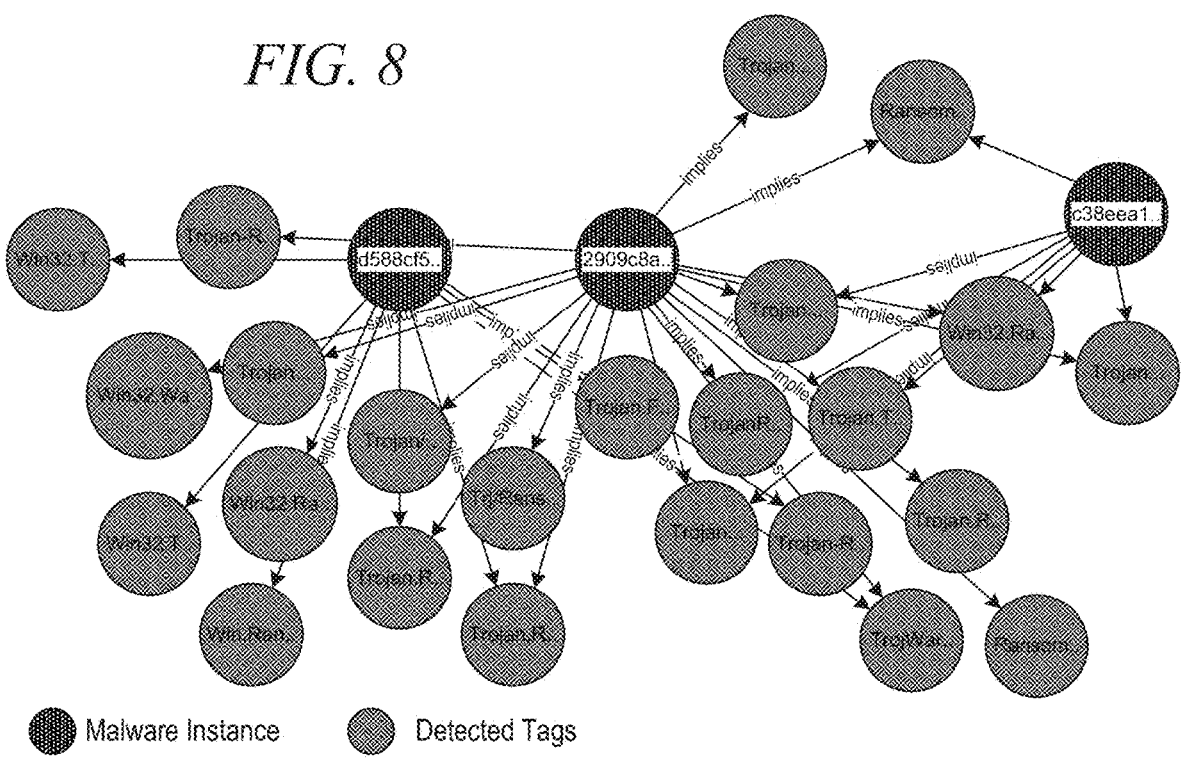
● Malware Instance   ● Detected Tags ○ Malware Family
● Detected Tags

AUTOMATED IDENTIFICATION OF MALWARE FAMILIES BASED ON SHARED EVIDENCES

BACKGROUND

The present application relates generally to an improved data processing apparatus and method and more specifically to mechanisms for automatically identifying family tree relationships among malware based on reasoning of indirect relations from observed entities to family entities.

Malware (malicious software) is any software intentionally designed to cause damage to a computer, server, client, or computer network. A wide variety of malware types exist, including computer viruses, worms, Trojan horses, ransomware, spyware, adware, rogue software, wiper, and scareware. Programs are also considered malware if they secretly act against the interests of the computer user. A range of antivirus software, firewalls, and other strategies are used to help protect against the introduction of malware, to help detect if it is already present, and to recover from malware-associated malicious activity and attacks.

Many early infectious programs, including the first Internet Worm, were written as experiments or pranks. Today, malware is used by both black hat hackers and governments to steal personal, financial, or business information. Malware is sometimes used broadly against government or corporate websites to gather guarded information or to disrupt their operation in general. However, malware can be used against individuals to gain information such as personal identification numbers or details, bank or credit card numbers, and passwords.

Since the rise of widespread broadband Internet access, malicious software has more frequently been designed for profit. Infected "zombie computers" can be used to send email spam, to host contraband data, or to engage in distributed denial-of-service attacks as a form of extortion. Programs designed to monitor users' web browsing, display unsolicited advertisements, or redirect affiliate marketing revenues are called spyware. Spyware programs do not spread like viruses; instead, they are generally installed by exploiting security holes. They can also be hidden and packaged together with unrelated user-installed software.

Ransomware affects an infected computer system in some way and demands payment to bring it back to its normal state. There are two variations of ransomware, being crypto ransomware and locker ransomware. Locker ransomware locks down a computer system without encrypting its contents, whereas the traditional ransomware is one that locks down a system and encrypts its contents. For example, programs such as CryptoLocker encrypt files securely and only decrypt them on payment of a substantial sum of money.

Some malware is used to generate money by click fraud, making it appear that the computer user has clicked an advertising link on a site to generate a payment from the advertiser. In addition to criminal money-making, malware can be used for sabotage, often for political motives. Stuxnet, for example, was designed to disrupt very specific industrial equipment. There have been politically motivated attacks that spread over and shut down large computer networks, including massive deletion of files and corruption of master boot records, described as "computer killing."

The best-known types of malware, viruses and worms, are known for the manner in which they spread, rather than any specific types of behavior. A computer virus is software that embeds itself in some other executable software, including the operating system itself, on the target system without the user's knowledge and consent, and when it is run, the virus is spread to other executables. On the other hand, a worm is a stand-alone malware software that actively transmits itself over a network to infect other computers and can copy itself without infecting files. These definitions lead to the observation that a virus requires the user to run an infected software or operating system for the virus to spread, whereas a worm spreads itself.

A specific component of anti-virus and anti-malware software, commonly referred to as an on-access or real-time scanner, hooks deep into the operating system's core or kernel and functions in a manner similar to how certain malware itself would attempt to operate, though with the user's informed permission for protecting the system. Any time the operating system accesses a file, the on-access scanner checks if the file is a "legitimate" file or not. If the file is identified as malware by the scanner, the access operation will be stopped, the file will be dealt with by the scanner in a pre-defined way, and the user will be notified. This may have a considerable performance impact on the operating system, though the degree of impact is dependent on how well the scanner was programmed. The goal is to stop any operations the malware may attempt on the system before they occur, including activities which might exploit bugs or trigger unexpected operating system behavior.

Anti-malware programs can combat malware in two ways. They can provide real time protection against the installation of malware software on a computer. This type of malware protection works the same way as that of antivirus protection in that the anti-malware software scans all incoming network data for malware and blocks any threats it comes across. Anti-malware software programs can be used solely for detection and removal of malware software that has already been installed onto a computer. This type of anti-malware software scans the contents of the registry, operating system files, and installed programs on a computer and provides a list of any threats found, allowing the user to choose which files to delete or keep or to compare this list to a list of known malware components, removing files that match.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement a malware family identification engine for automatically identifying family tree relationships among malware based on reasoning of indirect relations from observed entities to family entities. The method comprises constructing a graph data structure of direct relationships between malware instances and malware families, direct relationships between malware instances and detected tags, and indirect relationships between detected tags and malware families. Each detected tag node has one or more outgoing links (OGLs) to malware family nodes. The method further comprises building a dictionary data structure comprising detected tag entries linking each detected tag to one or more malware family nodes based on the graph data structure. The method further comprises identifying significant indirect entities (SIEs) within the detected tag entries of the dictionary data structure. The method further comprises selecting a SIE with a highest number of out-going links (OGLs) as a root node in a family tree data structure. The method further comprises recursively connecting SIEs with a number of OGLs less than the highest number of OGLs to the root node in the family tree data structure and converting each SIE name in the family tree data structure to a chained family entity name in the family tree data structure.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 illustrates an example graph constructed with direct relationships between malware instances and malware families in accordance with an illustrative embodiment;

FIG. 8 illustrates an example graph constructed with direct relationships between malware instances and evidences in accordance with an illustrative embodiment.

DETAILED DESCRIPTION

Figure 1:
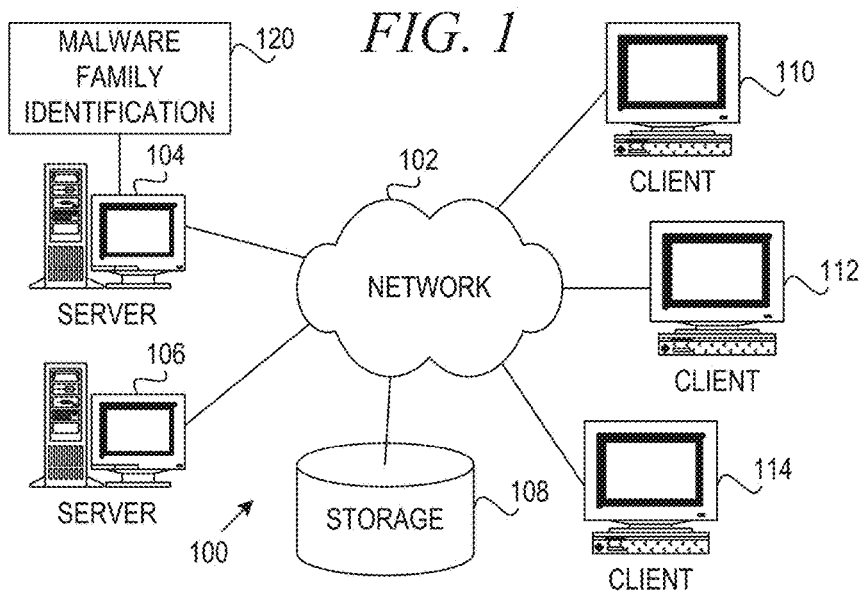
FIG. 1 is an example diagram of a distributed data processing system in which aspects of the illustrative embodiments may be implemented.

A malware family is a group of applications with similar attack techniques. Ordinary biological evolution analogies are ill-suited for reconstructing malware phylogenies. Biological phylogenies assume a single common ancestor. Malware often has more than a single ancestor. Source code malware appears to evolve by feature addition or subtraction. There is currently no way to automate the organization of a family tree without analyzing source code.

The illustrative embodiments provide a malware family identification engine to create malware family tree data structures based on reasoning of indirect relations from observed entities to the family entities. The malware family identification engine constructs knowledge graphs and discovers indirect relations from the graph. The malware family identification engine constructs a dictionary from indirect nodes to the targeted family nodes. Based on the number of indicated family nodes for each indirect node, the malware family identification engine chooses indirect nodes with the most indicators as a root, recursively connects the indirect nodes with lesser indications to form a tree, and coverts the indirect node names to a chained family name.

The illustrative embodiments provide a more "affordable" way to automatically generate a family tree compared to those requiring analysis of source code. The malware family identification engine of the illustrative embodiments can be generalized to deal with an entity graph instead of just malware/threat families. The family tree provides guidance for people or anti-malware software to understand the common properties of each family to deal with the situation (attacks, risks, problems, etc.). In response to detection of a malware instance, the malware family identification engine of the illustrative embodiments identifies evidences associated with the malware instance, determines a malware family indicated by the identified evidences, and performs mitigating actions for the detected malware instance based on the common properties of the malware family.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
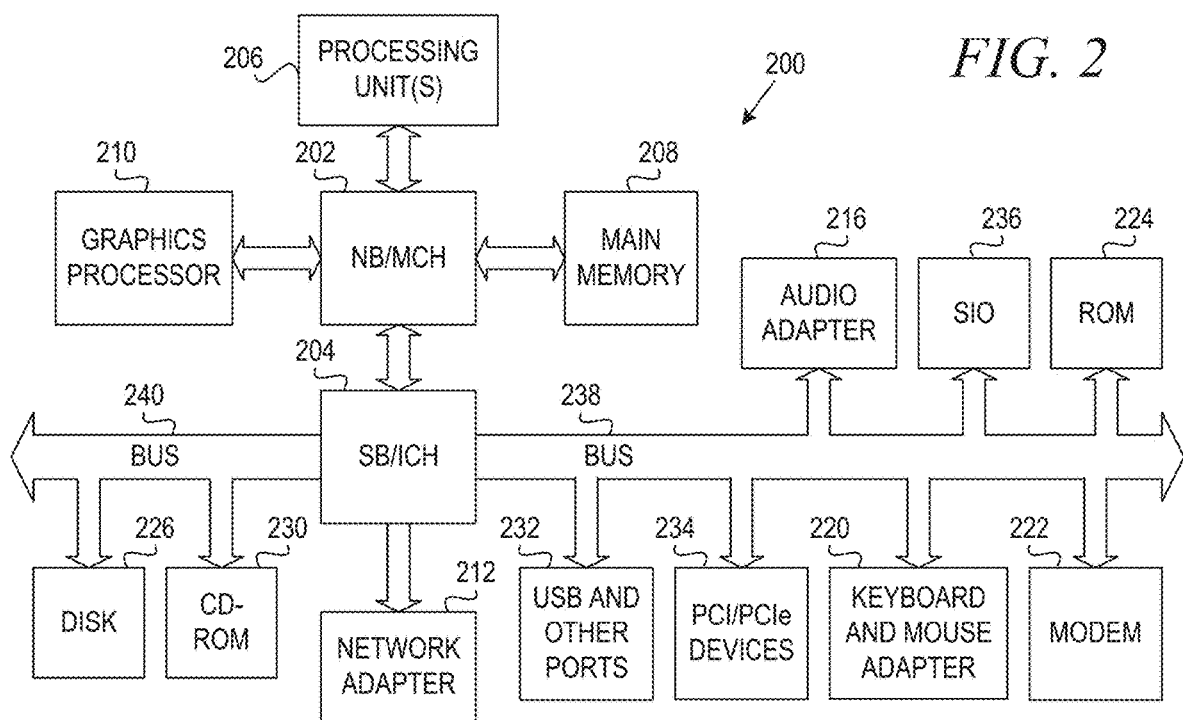
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a malware family identification engine for automatically identifying family tree relationships among malware based on reasoning of indirect relations from observed entities to family entities. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

The illustrative embodiments provide a malware family identification engine 120 to create malware family tree data structures based on reasoning of indirect relations from observed entities to the family entities. The malware family identification engine 120 constructs knowledge graphs and discovers indirect relations from the graph. The malware family identification engine 120 constructs a dictionary from indirect nodes to the targeted family nodes. A dictionary is a fast lookup data structure with an index "page" linking each entity to other entities. A dictionary entry is similar to an index page with a detection tag (e.g., backdoor.c) and its contents page number. On the contents page is a list of malware families associated indirectly with the detection tag.

A "direct" relationship means an entity has a direct connection to another entity, which can be found in a public data source. For instance, a file hash (e.g., 3CBCFDDEC145E3382D592266BE) implies a malware family (e.g., badrabbit).

file hash: 3CBCFDDEC145E3382D592266BE implies→malware family: badrabbit (This is public knowledge.)

An "indirect" entity means a detection tag (e.g., backdoor.c) is found to be associated with some malware (e.g., badrabbit) due to the indirect connection of file hash. For instance, a file hash (e.g., 3CBCFDDEC145E3382D592266BE) also implies a detection tag (e.g., backdoor.c).

file hash: 3CBCFDDEC145E3382D592266BE also implies→detection tag: backdoor.c (This is public knowledge.)

However, there is no public knowledge that detection tag: backdoor.c implies malware family: badrabbit.

Then another file hash is detected: 856C2C5FDB96DCEEB233D12E34. From public knowledge, it can be deducted that 856C2C5FDB96DCEEB233D12E34 implies detection tag: backdoor.c. Also, 856C2C5FDB96DCEEB233D12E34 implies malware family: hackrabbit. The malware family identification engine of the illustrative embodiment determines whether hackrabbit could actually be related to badrabbit given the common indirect entity (e.g., detection tag: backdoor.c). If "backdoor.c" is significant enough, meaning it is found to always be associated with both badrabbit and hackrabbit. In this example, "detection tag: backdoor.c" is considered an indirect entity, because the entity suggests that file hash: 856C2C5FDB96DCEEB233D12E34 shares some common detection tag with file hash 3CBCFDDEC145E3382D592266BE. In other words, the dictionary, with all the known detection tags and malware families built from public knowledge, provides the direct relationships that are used to deduce the indirect relationships.

By looking up the direct relationships in the dictionary, the illustrative embodiment builds a family tree. First, the dictionary must be pruned to leave only significant "indirect entities." Non-significant entities make building the family tree more difficult. For example, a tag "malicious" that basically points to every malware family is not useful at all. Thus, the "malicious" tag entity is deleted from the dictionary.

Based on the number of indicated family nodes for each indirect node, the malware family identification engine 120 chooses indirect nodes with the most indicators as a root, recursively connects the indirect nodes with lesser indications to form a tree, and coverts the indirect node names to a chained family name. The family tree is then built as follows:

backdoor.c (a parent tree node due to badrabbit and hackrabbit) has the most outgoing links (OGLs), with OGL=2.

backdoor.c.bad (a child tree node due to pointing to badrabbit only, with OGL=1.

Then, in the above example, the malware family identification engine 120 converts the parent node to be a "badrabbit, hackrabbit" family node with a child node representing the "badrabbit" family node.

The family tree provides guidance for people or anti-malware software to understand the common properties of each family to deal with the situation (attacks, risks, problems, etc.). In response to detection of a malware instance, the malware family identification engine 120 identifies evidences associated with the malware instance, determines a malware family indicated by the identified evidences, and performs mitigating actions for the detected malware instance based on the common properties of the malware family.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates automatically creating a malware family tree based on reasoning of indirect relations from observed entities to the family entities.

As noted above, the mechanisms of the illustrative embodiments utilize specifically configured computing devices, or data processing systems, to perform the operations for automatically identifying family tree relationships among malware based on reasoning of indirect relations from observed entities to family entities. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. In a client device, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to automatically creating malware family tree data structures based on reasoning of indirect relations from observed entities to the family entities.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
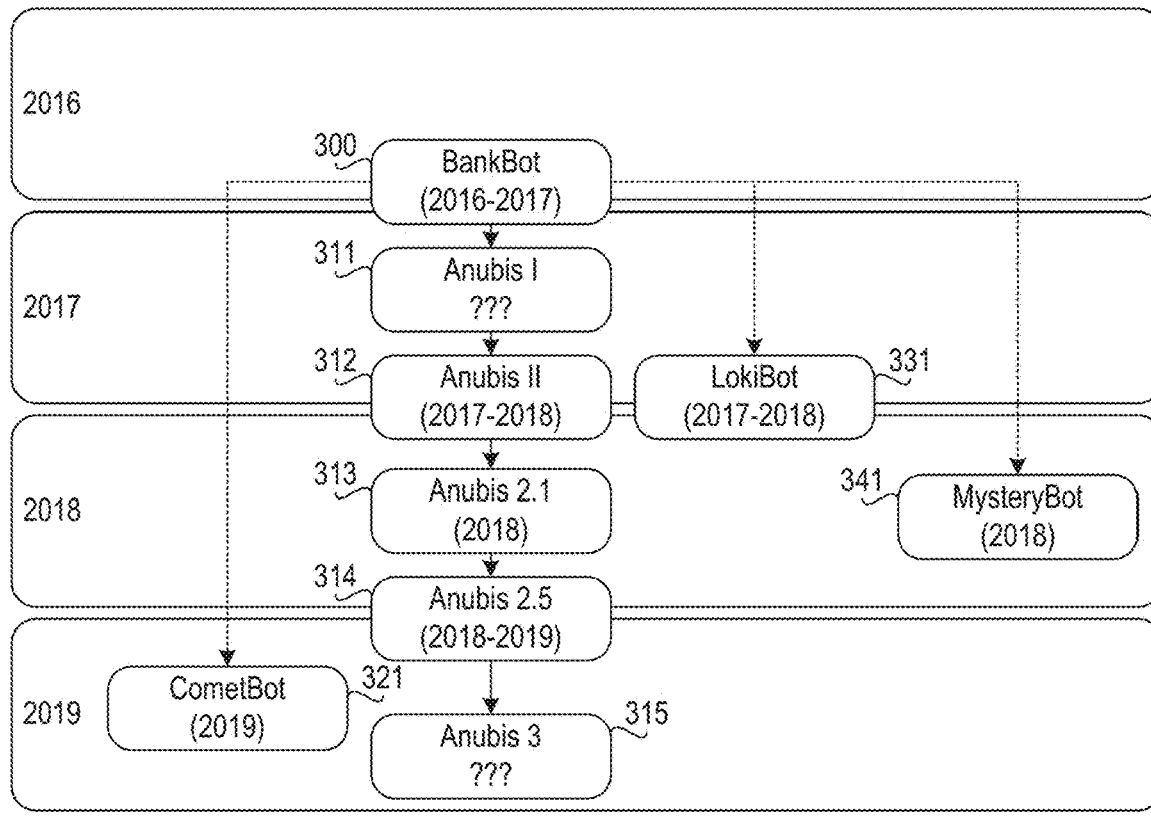
FIG. 3 illustrates a malware family tree with a single ancestor in accordance with an illustrative embodiment.

FIG. 3 illustrates a malware family tree with a single ancestor in accordance with an illustrative embodiment. As shown in FIG. 3, a root malware entity was discovered in 2016, shown as BankBot 300. Anubis I 311 was derived from BankBot 300 and discovered in 2017. Then, Anubis II 312 was derived from Anubis I and discovered in 2017. In 2018, Anubis 2.1 313 and Anubis 2.5 314 were discovered, followed by Anubis 3 315 in 2019.

However, as stated above, malware often has more than a single ancestor. The illustrative embodiments provide a malware family identification engine for understanding the family tree relationships among entities that branch like a tree. The malware family identification engine constructs a family tree by discovering shared evidence nodes or "evidences," which are entities that indirectly point to another target entity from the source entity with direct relation to the target entities.

Evidence is a piece of information indicating the existence of another usually derived information. Some evidence is strong, meaning it almost "implies" the existence of another information. In the context of malware forensics, digital impression evidence includes the imprints and artifacts left in physical memory and the file system of the victim system resulting from the execution and manifestation of suspect malicious code. Digital impression evidence can be a unique identifier relating to a particular malicious code, or it can reveal how certain events occurred while the suspect malware executed and manifested. Digital impression evidence can be collected and preserved for correlation and comparison with other evidence or known malicious code infection patterns and artifacts. For instance, newly created files on the victim file system should be collected and analyzed.

Figure 4:
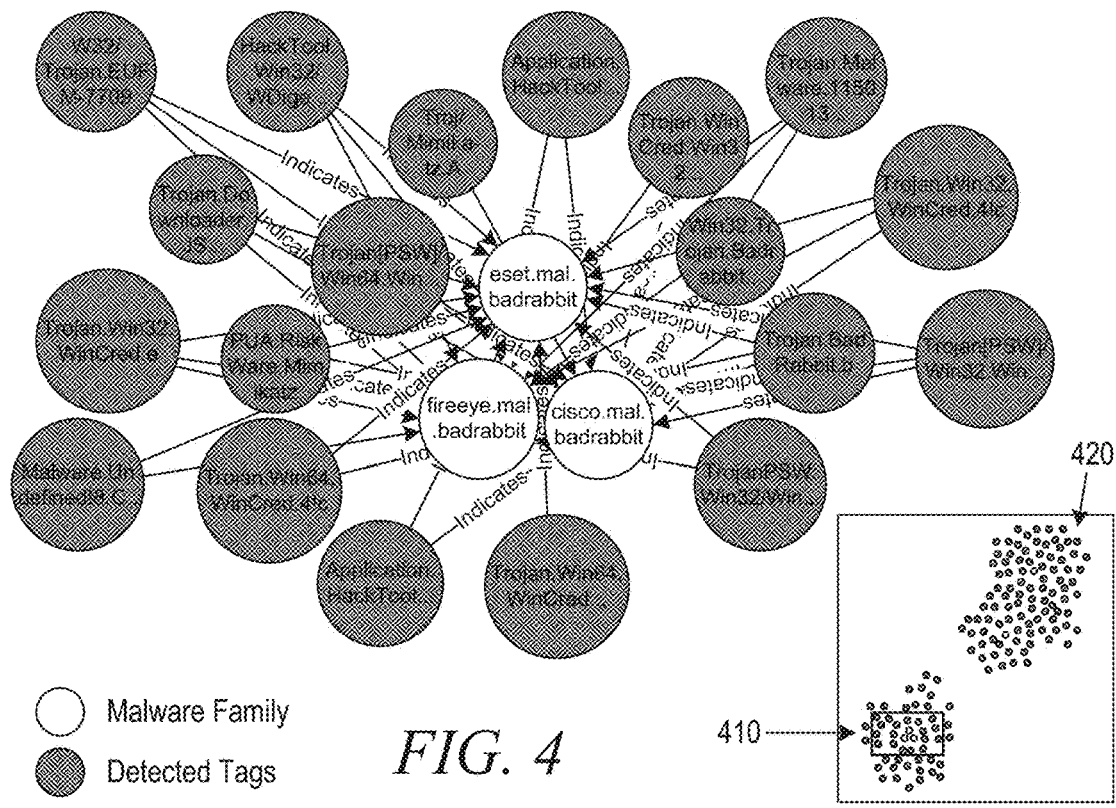
FIG. 4 illustrates a graph of malware families in accordance with an illustrative embodiment.

FIG. 4 illustrates a graph of malware families in accordance with an illustrative embodiment. In the depicted example, the malware families are clustered by the evidences. Cluster analysis or clustering is the task of grouping a set of objects in such a way that objects in the same group (i.e., a cluster) are more similar to each other than to those in other groups. In the illustrative embodiments, the malware families are clustered based on shared evidences rather than distances in the data space. Common evidences indicate the homogeneity of the clustered malware families, and, therefore, a "super class" appears. Also, "sub classes" appear from the separation of sub graphs. For example, at 410 the three "families" have strong relationships given they have common evidences surrounding them, while at 420 the two "families" have weak relationships but are strongly different from the other three families in 410.

Figures 5, 6:
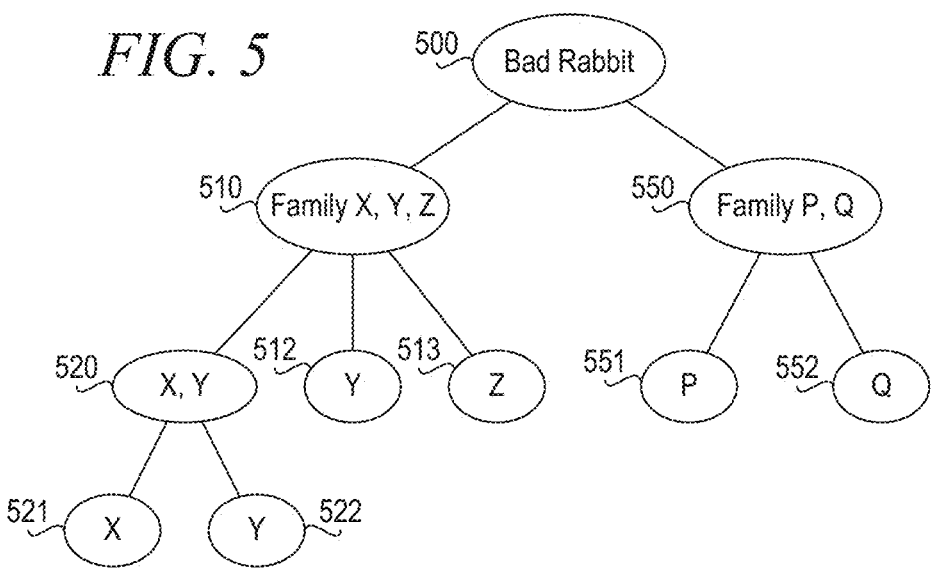
FIG. 5 illustrates a family tree constructed by discovering shared evidence nodes in accordance with an illustrative embodiment.
FIG. 6 illustrates an example implementation of automatically identifying family tree relationships among malware based on reasoning of indirect relations from observed entities to family entities in accordance with an illustrative embodiment.

FIG. 5 illustrates a family tree constructed by discovering shared evidence nodes in accordance with an illustrative embodiment. Family nodes that share some evidences are grouped together as an abstract family. Abstract family nodes with "containing" relations are organized as a tree. The tree reveals the evolution paths of malware and provides guidance to remediation.

In the depicted example, the malware family identification engine of the illustrative embodiment determines that the family "Bad Rabbit" 500 contains "Family X, Y, Z" 510 and "Family P, Q" 550 because they share common evidences. In turn, "Family X, Y, Z" 510 contains family "X, Y" 520, malware Y 512 and malware Z 513. That is, the malware contained by family "X, Y" 520, the malware Y 512, and the malware Z 513 have enough evidences in common to be considered a family, "Family X, Y, Z" 510. Also, the family "X, Y" 520 contains malware family X 521 and malware family Y 522. That is, malware family X 521 and malware family Y 522 have evidences in common that they do not have in common with malware Z 513. Family "X, Y" 520 exists because X and Y share strong evidence. That is, some evidence pointing to X is point to Y as well. Family 512 and family 522 exist because there are unique evidences pointing to Y and Y only.

In addition, "Family P, Q" 550 contains malware P 551 and malware Q 552. That is, malware P 551 and malware Q 552 have enough evidences in common to be considered a family and have evidences in common that they do not have in common with malware in "Family X, Y, Z" 510.

FIG. 6 illustrates an example implementation of automatically identifying family tree relationships among malware based on reasoning of indirect relations from observed entities to family entities in accordance with an illustrative embodiment. As shown in FIG. 6, the family "badrabbit" contains the families "badrabbit, kapersky.mal.synack," "badrabbit, qihoo360.mal.smokeloader," "badrabbit, trendmicro.mal.badrabbit," "cisco.mal.badrabbit, eset.mal.badrabbit, fireeye.mal.badrabbit," and "eset.mal.badrabbit." Of these sub-families, "badrabbit, kapersky.mal.synack" contains the malware named "badrabbit." The sub-family "cisco.mal.badrabbit, eset.mal.badrabbit, fireeye.mal.badrabbit" contains the malware "cisco.mal.badrabbit" and "fireeye.mal.badrabbit."

In the depicted example, "eset.mal.badrabbit" can be under both positions, but the depicted implementation keeps only one. That is, "eset.mal.badrabbit" has unique evidences that identify it and it alone.

FIG. 7 illustrates an example graph constructed with direct relationships between malware instances and malware families in accordance with an illustrative embodiment. As shown in FIG. 7, there are known malware instances that imply the malware family "wannacry." These direct relationships represent knowledge and facts.

Figure 9:
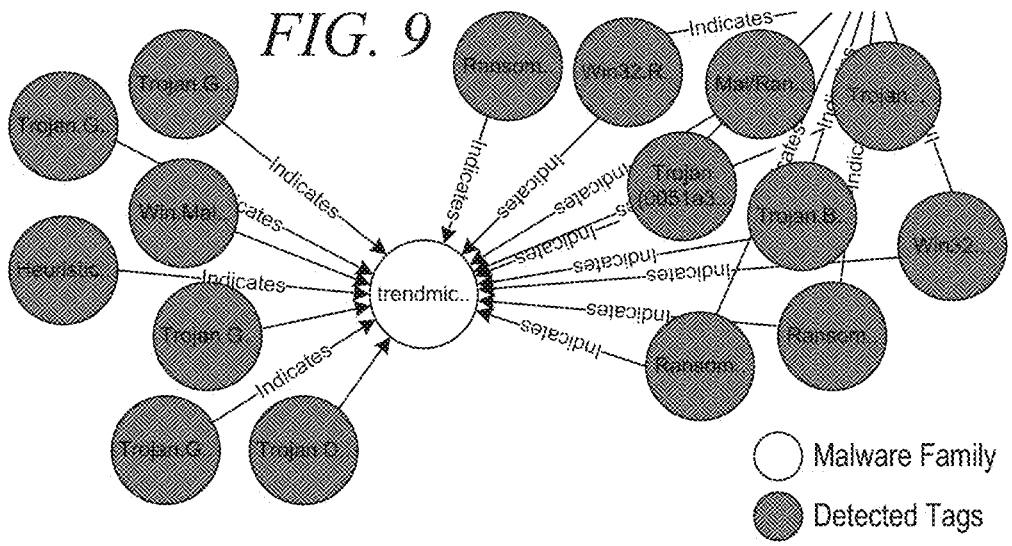
FIG. 9 illustrate an example graph constructed with indirect relationships between evidences and malware families in accordance with an illustrative embodiment.

FIG. 8 illustrates an example graph constructed with direct relationships between malware instances and evidences in accordance with an illustrative embodiment. As shown in FIG. 8A, each malware instance implies some detected tags. FIG. 9 illustrates an example graph with constructed indirect relationships between evidences and malware families in accordance with an illustrative embodiment. As shown in FIG. 9, the evidences (e.g., detected tags) indirectly indicate the malware family. The detection tag could be evidence or strong evidence if it often or always points to the same malware family. The detection tags are considered indirect entities because they have outgoing links that indirectly indicate malware families. A tag with the most outgoing links means the tag is commonly shared by a larger group of malware families. Therefore, such a tag is likely pointing to the ancestor family. However, a tag shared by too many malware families (e.g., all families) may not be useful and, thus, may be pruned.

A tag (also referred to herein as an "evidence" or an indirect entity) is significant if the following are true:

1. It only points to a few malware families but not all. A threshold number of outgoing links (OGLs) may be used. For instance, the entity has the most OGLs where the number of OGLs is less than the threshold.

2. It is observed in many public data sources or cases. A threshold number of references in public data sources may be used such that the SIE must have been observed in a number of public data sources or cases greater than the threshold. The threshold may be adjusted based on the number of public data sources or cases.

Figure 10:
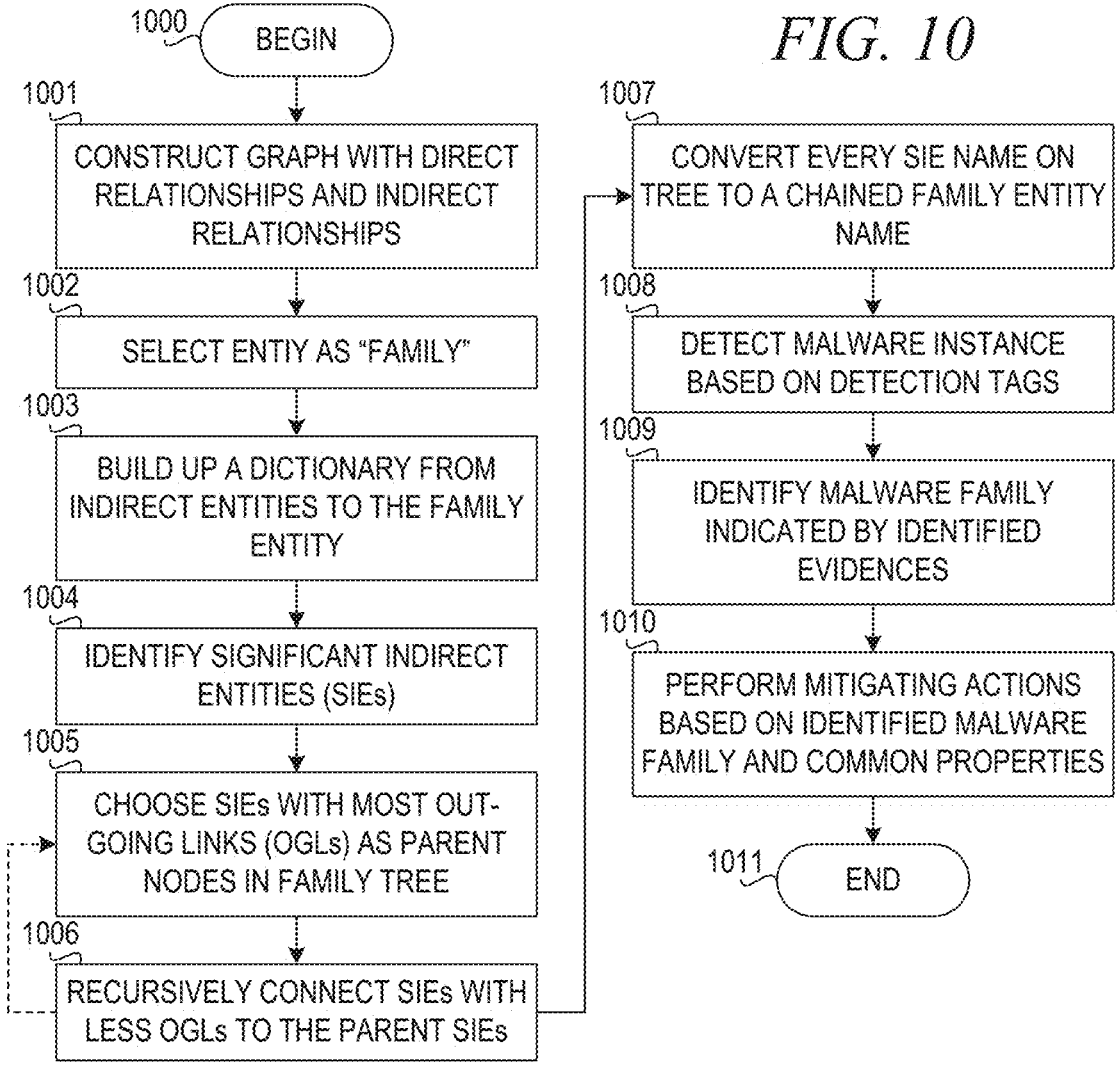
FIG. 10 is a flowchart illustrating operation of a malware family identification engine for automatically identifying family tree relationships among malware based on reasoning of indirect relations from observed entities to family entities in accordance with an illustrative embodiment.

FIG. 10 is a flowchart illustrating operation of a malware family identification engine for automatically identifying family tree relationships among malware based on reasoning of indirect relations from observed entities to family entities in accordance with an illustrative embodiment. Operation begins (block 1000), and the malware family identification engine constructs a graph with direct relationships and indirect relationships (block 1001). The nodes of the graph (i.e., the detection tags, malware instances, and malware families) are retrieved from a published database. Usually, one does not find the same malware instance that already has some implied evidence. But one can find an unusual malware instance that reveals some evidence nodes indicating a known malware family.

The malware family identification engine selects an entity as a "family" (block 1002) and builds up a dictionary from indirect entities to the family entity (block 1003). There are three types of nodes in the dictionary in this example: malware family, hashes, and detection names. The malware family identification engine identifies significant indirect entities (SIEs) (block 1004). Entities (detection tag nodes) always pointing to the same other entities (malware families) are considered significant. Detection tag nodes pointing to arbitrary family nodes are insignificant. Additional weight can be found by checking the number of sightings in the published database. If the detection tag (evidence) nodes always point to the same family nodes and the reported number of sightings is high, then the entity is significant.

Then, the malware family identification engine chooses the SIEs with the highest number of out-going links (OGLs) as parent nodes in the family tree (block 1005). There may be one or a plurality of SIEs with the same number of OGLs. The malware family identification engine then recursively connects SIEs with less OGLs to the parent SIEs (block 1006). The process of block 1006 repeats for each SIE selected in block 1005 if more than one SIE has the highest number of OGLs. Also, the processes of blocks 1005 and 1006 are repeated for the next highest number of OGLs under each of the selected SIEs. This is shown as a dotted line from block 1006 to block 1005. The malware family identification engine converts every SIE name on the tree to a chained family entity name (block 1007).

Thereafter, the malware family identification engine detects a malware instance based on detected tags (block 1008). The malware family identification engine identifies a malware family indicated by the evidences (the detected tags) (block 1009). Then, the malware family identification engine performs mitigating actions based on the identified malware family and common properties (block 1010). Thereafter, operation ends (block 1011).

Thus, the illustrative embodiments provide a malware family identification engine for creating a family tree based on reasoning of indirect relations from observed entities to family entities. The malware family identification engine constructs a knowledge graph and discovers indirect relations from the graph. The malware family identification engine constructs a dictionary from indirect nodes to the targeted family nodes. Based on the number of indicated family nodes for each indirect node, the malware family identification engine chooses indirect nodes with the most indications as root nodes, recursively connects indirect nodes with lesser indications to form a tree, and converts the indirect node names to chained family names. The illustrative embodiment provides a more effective way to automatically generate malware family trees. The malware family identification engine of the illustrative embodiments can be generalized to deal with any entity graph instead of just malware/threat families. The family tree provides guidance to people or anti-malware software to understand the common properties of each family to deal with the situation (attacks, risks, problems, etc.).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a malware family identification engine for automatically identifying family tree relationships among malware based on reasoning of indirect relations from observed entities to family entities, the method comprising:
   constructing a graph data structure of direct relationships between malware instances and malware families, direct relationships between malware instances and detected tags, and indirect relationships between detected tags and malware families, wherein each detected tag node has one or more outgoing links (OGLs) to malware family nodes;
   building a dictionary data structure comprising detected tag entries linking each detected tag to one or more malware family nodes based on the graph data structure;
   identifying significant indirect entities (SIEs) within the detected tag entries of the dictionary data structure;
   selecting a SIE with a highest number of out-going links (OGLs) as a root node in a family tree data structure;
   recursively connecting SIEs with a number of OGLs less than the highest number of OGLs to the root node in the family tree data structure; and
   converting each SIE name in the family tree data structure to a chained family entity name in the family tree data structure.

2. The method of claim 1, wherein constructing a graph data structure comprises:
   constructing a first graph data structure of direct relationships between malware instances and malware families;
   constructing a second graph data structure of direct relationships between malware instances and detected tags; and
   constructing a third graph data structure of indirect relationships between detected tags and malware families based on the first and second graph data structures.

3. The method of claim 1, wherein the direct relationships between malware instances and malware families and the known direct relationships between malware instances and detected tags are discovered from a public data source.

4. The method of claim 1, wherein the direct relationships between malware instances and malware families and the known direct relationships between malware instances and detected tags are implies relationships.

5. The method of claim 1, wherein indirect relationships between detected tags and malware families are indicates relationships.

6. The method of claim 1, wherein identifying SIEs comprises identifying detected tag entities that link to a number of malware family nodes that is less than a first threshold.

7. The method of claim 1, wherein identifying SIEs comprises identifying detected tag entities that are observed in a number of public data sources or cases greater than a second threshold.

8. The method of claim 1, wherein identifying SIEs comprises deleting detected tag entries that are not identified as SIEs from the dictionary data structure.

9. The method of claim 1, further comprising:
detecting a new malware instance based on a set of detected tags;
identifying a malware family indicated by the set of detected tags based on the family tree data structure.

10. The method of claim 9, further comprising performing a mitigating action based on the identified malware family indicated by the set of detected tags.

11. A computer program product comprising a computer readable storage medium having a computer readable program stored therein, wherein the computer readable program, when executed on a computing device, causes the computing device to implement a malware family identification engine for automatically identifying family tree relationships among malware based on reasoning of indirect relations from observed entities to family entities, wherein the computer readable program causes the computing device to:
construct a graph data structure of direct relationships between malware instances and malware families, direct relationships between malware instances and detected tags, and indirect relationships between detected tags and malware families, wherein each detected tag node has one or more outgoing links (OGLs) to malware family nodes;
build a dictionary data structure comprising detected tag entries linking each detected tag to one or more malware family nodes based on the graph data structure;
identify significant indirect entities (SIEs) within the detected tag entries of the dictionary data structure;
select a SIE with a highest number of out-going links (OGLs) as a root node in a family tree data structure;
recursively connect SIEs with a number of OGLs less than the highest number of OGLs to the root node in the family tree data structure; and
convert each SIE name in the family tree data structure to a chained family entity name in the family tree data structure.

12. The computer program product of claim 11, wherein constructing a graph data structure comprises:
constructing a first graph data structure of direct relationships between malware instances and malware families;
constructing a second graph data structure of direct relationships between malware instances and detected tags; and
constructing a third graph data structure of indirect relationships between detected tags and malware families based on the first and second graph data structures.

13. The computer program product of claim 11, wherein the direct relationships between malware instances and malware families and the known direct relationships between malware instances and detected tags are discovered from a public data source.

14. The computer program product of claim 11, wherein the direct relationships between malware instances and malware families and the known direct relationships between malware instances and detected tags are implies relationships.

15. The computer program product of claim 11, wherein indirect relationships between detected tags and malware families are indicates relationships.

16. The computer program product of claim 11, wherein identifying SIEs comprises identifying detected tag entities that link to a number of malware family nodes that is less than a first threshold.

17. The computer program product of claim 11, wherein identifying SIEs comprises identifying detected tag entities that are observed in a number of public data sources or cases greater than a second threshold.

18. The computer program product of claim 11, wherein the computer readable program causes the computing device to:
detect a new malware instance based on a set of detected tags; and
identify a malware family indicated by the set of detected tags based on the family tree data structure.

19. The computer program product of claim 18, wherein the computer readable program causes the computing device to perform a mitigating action based on the identified malware family indicated by the set of detected tags.

20. An apparatus comprising:
a processor; and
a memory coupled to the processor, wherein the memory comprises instructions which, when executed by the processor, cause the processor to implement a malware family identification engine for automatically identifying family tree relationships among malware based on reasoning of indirect relations from observed entities to family entities, wherein the instructions cause the processor to:
construct a graph data structure of direct relationships between malware instances and malware families, direct relationships between malware instances and detected tags, and indirect relationships between detected tags and malware families, wherein each detected tag node has one or more outgoing links (OGLs) to malware family nodes;
build a dictionary data structure comprising detected tag entries linking each detected tag to one or more malware family nodes based on the graph data structure;
identify significant indirect entities (SIEs) within the detected tag entries of the dictionary data structure;
select a SIE with a highest number of out-going links (OGLs) as a root node in a family tree data structure;
recursively connect SIEs with a number of OGLs less than the highest number of OGLs to the root node in the family tree data structure; and
convert each SIE name in the family tree data structure to a chained family entity name in the family tree data structure.

* * * * *